Aug. 22, 1933.　　　H. H. HAINES　　　1,923,725
DISPLAY IN AIRCRAFT
Filed June 18, 1931　　5 Sheets-Sheet 1

Inventor
Harry H. Haines

By

Attorney

Aug. 22, 1933.   H. H. HAINES   1,923,725
DISPLAY IN AIRCRAFT
Filed June 18, 1931   5 Sheets-Sheet 2
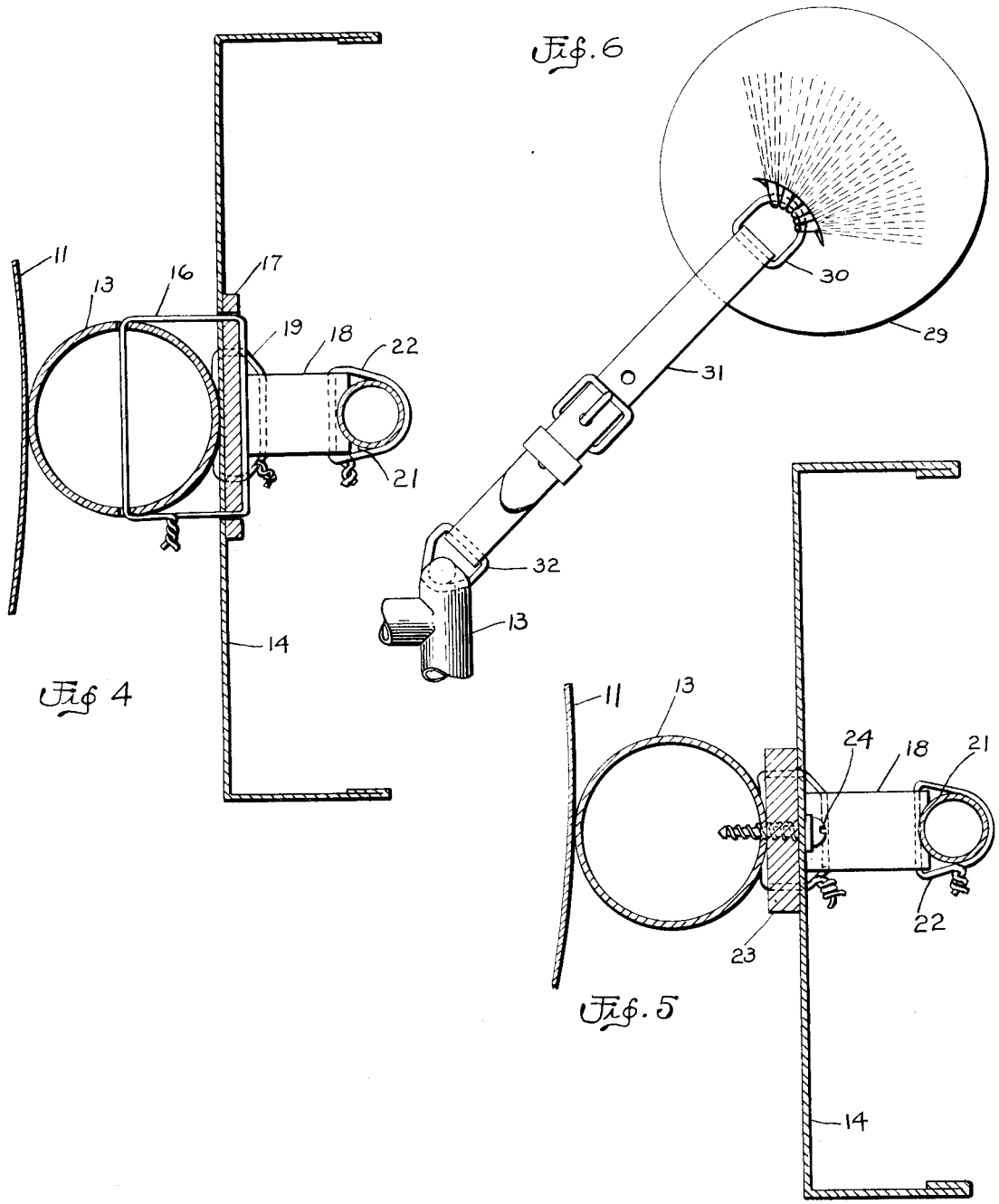

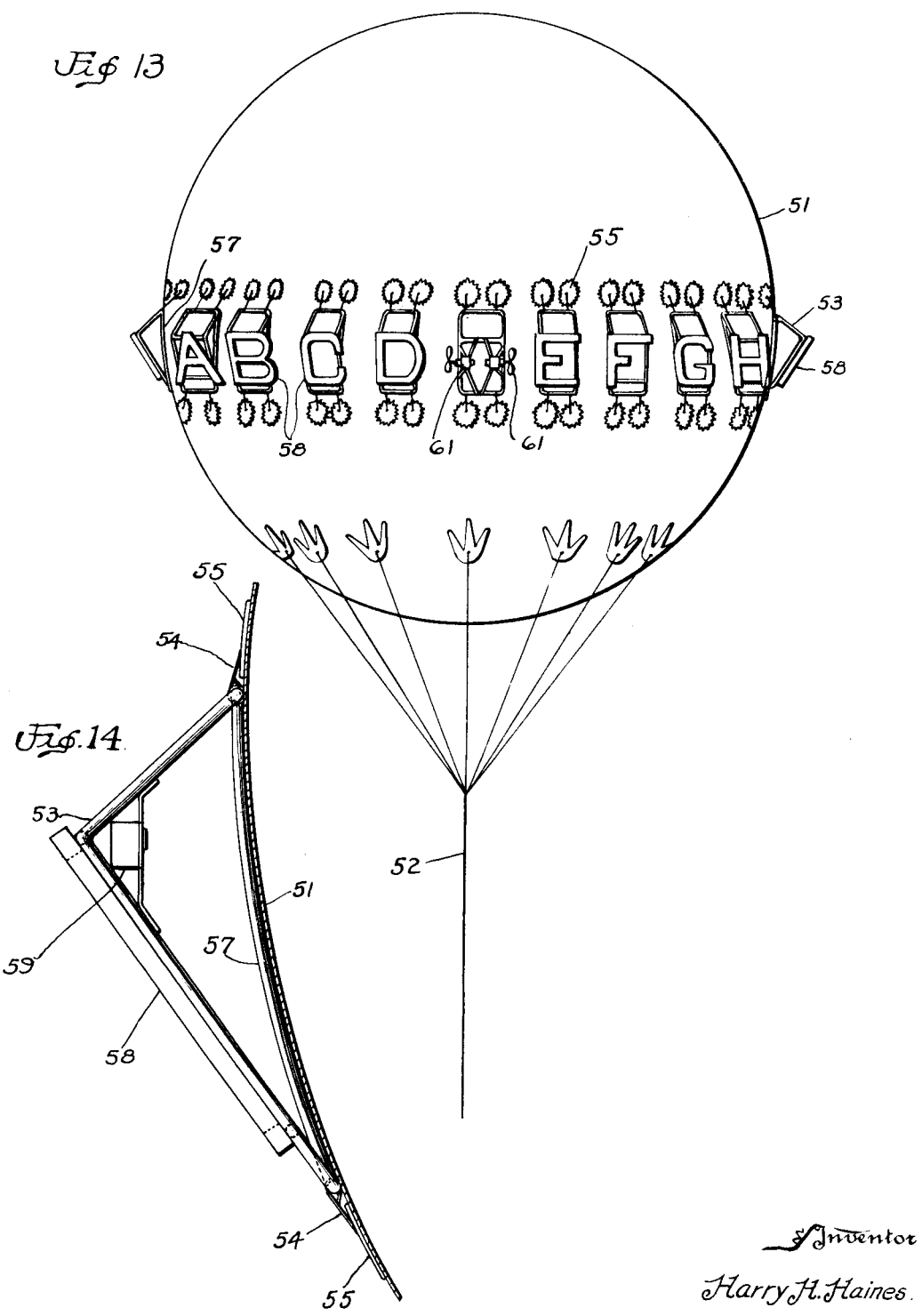

Patented Aug. 22, 1933

1,923,725

UNITED STATES PATENT OFFICE 1,923,725

DISPLAY IN AIRCRAFT

Harry H. Haines, Akron, Ohio, assignor to The Goodyear Tire & Rubber Company, Akron, Ohio, a Corporation of Ohio Application June 18, 1931. Serial No. 545,165

11 Claims. (Cl. 40—127)

This invention relates to lighter-than-aircraft and more particularly to illuminated signs or the like adapted to be carried thereon.

Some attempts have been made heretofore to provide aircraft with illuminated signs for display, signalling or advertising purposes. However, numerous difficulties have been experienced which have rendered all known devices either impractical or undesirable. A major factor to consider is weight. The display apparatus must be of such size as to be visible from a considerable distance due to the height and distance at which an aircraft is generally flown. Yet the weight must be maintained at a minimum or otherwise the device will be impractical because the useful lifting capacity of the aircraft will be too limited for practical purposes.

The fragility of the illuminating devices has also rendered their use on aircraft impractical as the shocks received by the aircraft in landing, etc., are often sufficient seriously to damage the illuminating equipment. The air resistance of the illuminated signs or illuminating apparatus has also presented difficulties.

One object of the invention is to provide a display balloon in which the display is constantly rotated whereby the effectiveness of the display is increased.

Another object of the invention is to avoid or overcome the disadvantages mentioned above by the provision of a light, rugged illuminated sign which is sufficiently large to be visible at considerable distance and which offers a minimum of air resistance.

Another object of the invention resides in the provision of neon lighting for the illuminating means.

Another object of the invention is to provide a strong but light frame for carrying the sign parts themselves and to provide improved means for removably securing the frame to the aircraft.

Another object of the invention is to provide a sign which comprises a plurality of units which may be assembled on the aircraft.

Another object of the invention resides in the provision of means for supporting the illuminating means themselves in such manner as to minimize the possibility of injuring them.

For a better understanding of the invention, reference may now be had to the accompanying drawings forming a part of this specification, of which:

Fig. 4 is a cross-sectional view taken through one of the display devices illustrating the construction thereof;

Fig. 5 is a view similar to Fig. 4 but of a modified form of invention;

Fig. 6 is a fragmentary view, on a larger scale, of the preferred means for fastening the display devices to the gas envelope of an aircraft;

Fig. 13 is a side elevational view of an anchored display balloon;

Fig. 14 is a side elevational view, on a larger scale, of a display device attached to a gas envelope; and Fig. 15 is a front elevational view of the display device illustrated in Fig. 14.

Figure 1:
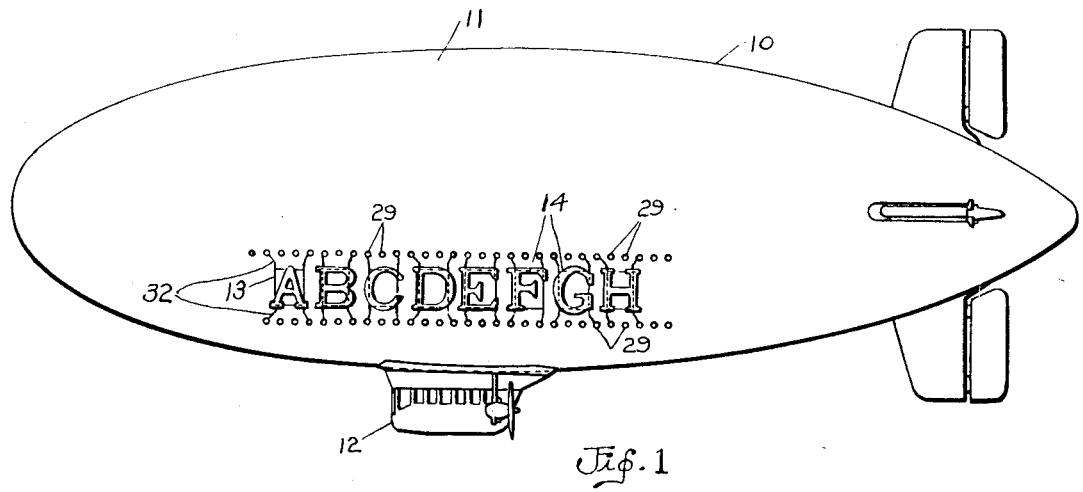
Fig. 1 is a side elevational view of an aircraft embodying the invention.

Referring to Fig. 1 of the drawings, an airship 10 includes a gas filled envelope 11 which supports a control car 12. It will be understood that the airship may be in the form of any type of a lighter-than-aircraft and is shown in conjunction with a blimp for illustrative purposes only. A plurality of frames 13 secured to the side of the envelope 11 are built up of hollow aluminum or light alloy tubing in order that the desired strength is obtained while maintaining a minimum of weight. The frames 13 carry letters or other sign forming or display devices 14 which are preferably in the form of channels, as indicated in Figs. 4 and 5. The letters 14 are secured to the frames 13 by any suitable means which may comprise a plurality of wires 16 extending through wooden spacing members 17 and through suitable openings in the frame members. Rubber supporting members 18 are secured in the channel letters 14 at suitable intervals by wires 19, which members carry illuminating means, such as neon tubes 21, centrally of the channel in the letters 14. The tubes 21 may be secured to the rubber supporting members 18 by wires 22.

In the form of the invention illustrated in Fig. 5, blocks 23 are provided between the tube frame 13 and the channel letters 14 so that straps or the like by which the frame is secured to the envelope 16 can be passed more readily around the frame. The channel letters 14 and blocks 23 may be secured to the frame 13 by screws 24.

Figures 2, 3:
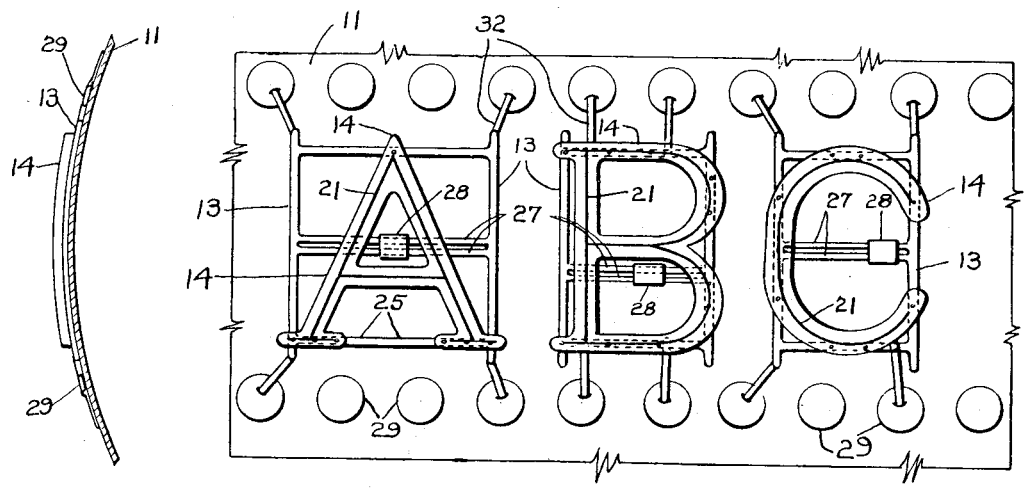
Fig. 2 is a fragmentary elevational view, on a larger scale, of a portion of the display device illustrated in Fig. 1.
Fig. 3 is an end view of the display devices illustrated in Fig. 2.
Figure 7:
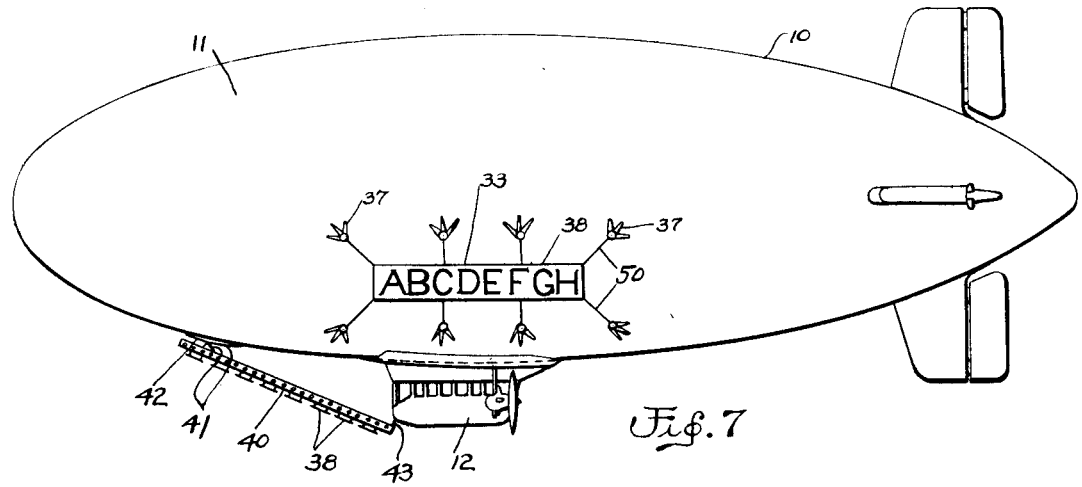
Fig. 7 is a side elevational view of an airship and illustrating another form of the invention.
Figure 9:
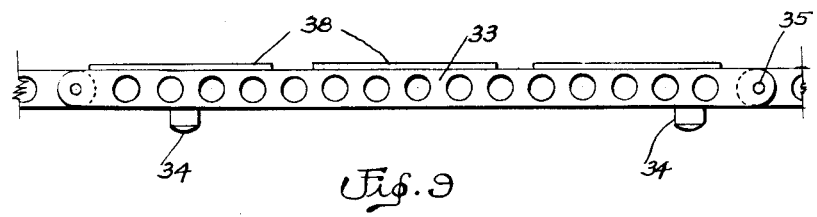
Fig. 9 is a plan view of the portion of the display device shown in Fig. 8.

The frames 13 are provided with suitable means 27 for supporting transformers 28, which are used in conjunction with the neon tubes 21. The transformers 28 are carried on the frame 13 in such manner that they will extend into the open portions of the letters 14 as indicated in Fig. 2. Thus the over-all thickness of the illuminating devices will not be increased. As shown in Fig. 3, the frames 13 and the letters 14 carried thereon are so curved as to conform with the contour of the gas filled envelope 16, thereby facilitating the fastening of the frames 13 to the envelope 11 and minimizing the air resistance of the display devices.

The frames 13 are secured to the envelope 11 preferably by providing a plurality of rows of aligned patches 29 to which rope rings 30 are secured. Flexible and adjustable straps 31 are disposed through the rings 30 and through rings 32 on the frame 13 and serve to support and position the frames. Instead of passing through rings 32 on the frames, the straps may, if desired, be looped about horizontal portions of the frames as indicated at 25 in Fig. 2. By providing a plurality of patches 29 and a number of frames having different letters or signs thereon, substantially any words or display can be readily applied to the gas envelope 11. In addition, changes in the words or display may be effected without material loss of time and without changing or requiring new fastening means.

Figures 8, 10:
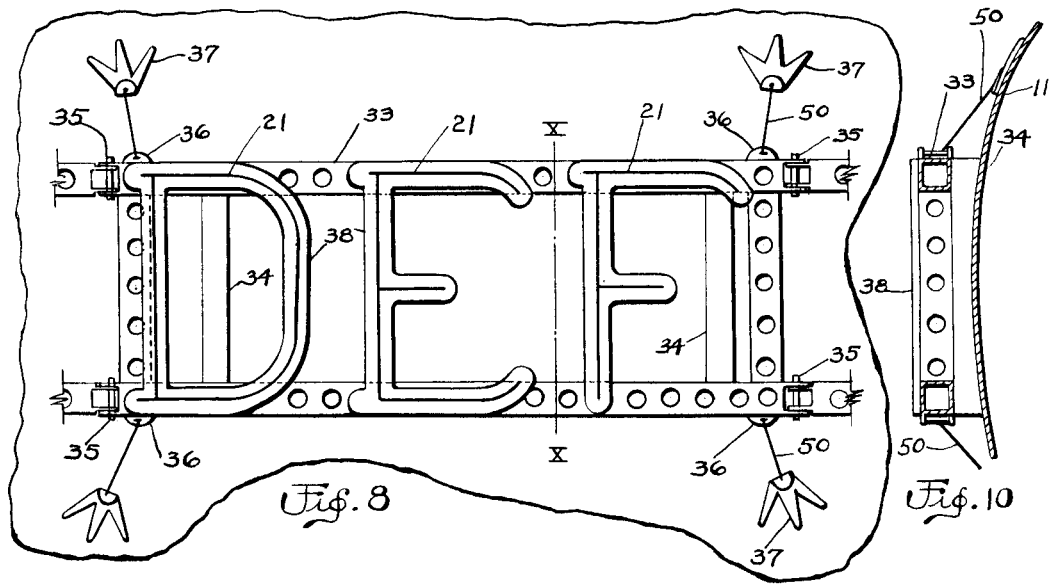
Fig. 8 is a fragmentary elevational view, on a larger scale, of a portion of the display device shown in Fig. 7.
Fig. 10 is a cross-sectional view taken on the line X—X of Fig. 8.
Figure 11:
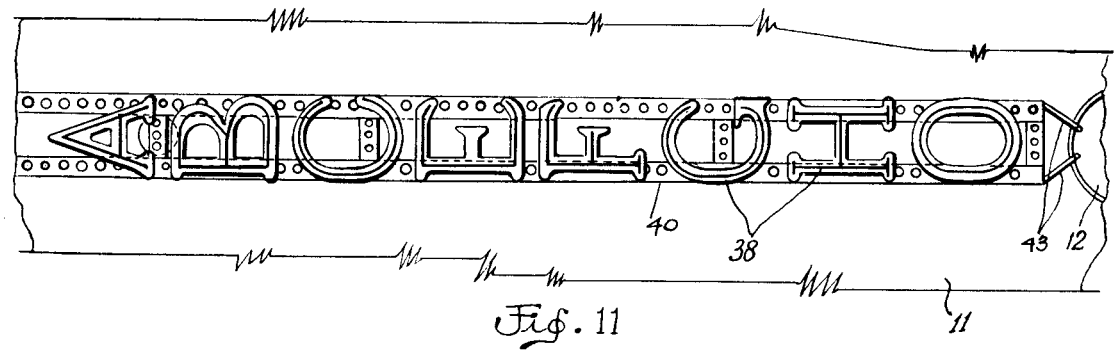
Fig. 11 is a bottom plan view of the display device illustrated in Fig. 7.

In the form of the invention illustrated in Figs. 7 to 12, the display device comprises a plurality of sections 33 which are formed of aluminum or light alloy girders, which sections are provided with curved felt or rubber covered portions 34, which are adapted to conform with the contour of the envelope 16 as indicated in Fig. 10. The sections 33 are provided with pivotal connections 35 to form an articulated display device of suitable size. Perforated ears 36 are also provided by which each section 33 can be individually secured to the envelope 16 by fastening means 50 similar to those indicated in Fig. 6, although in this construction, it may be desirable to provide patches 37 somewhat larger and of somewhat different forms from the patches 28 because the weight supported by each one is greater.

Any desired type of sign or letters 38 is supported on the sections 33 and preferably the construction thereof is similar to that shown in Figs. 4 or 5 and explained above. Electric current may be supplied to the letters of each section 33 or may be supplied selectively to each individual letter or sign member 38 in a manner similar to that shown in Fig. 2.

A display device, which is secured to the bottom of the envelope 11, comprises a frame 40 which is flexibly secured near its front end to the envelope 11 by straps 41 and patch 42 in a manner similar to that by which the display devices are secured to the side of the envelope. The other end of the frame 40 is secured to the control car 17 by flexible straps 43. The frame 40 will serve to support a number of letters or other sign forming characters 44 which are preferably similar to those used in the side display device and which are provided with neon lighting in a like manner.

Figure 12:
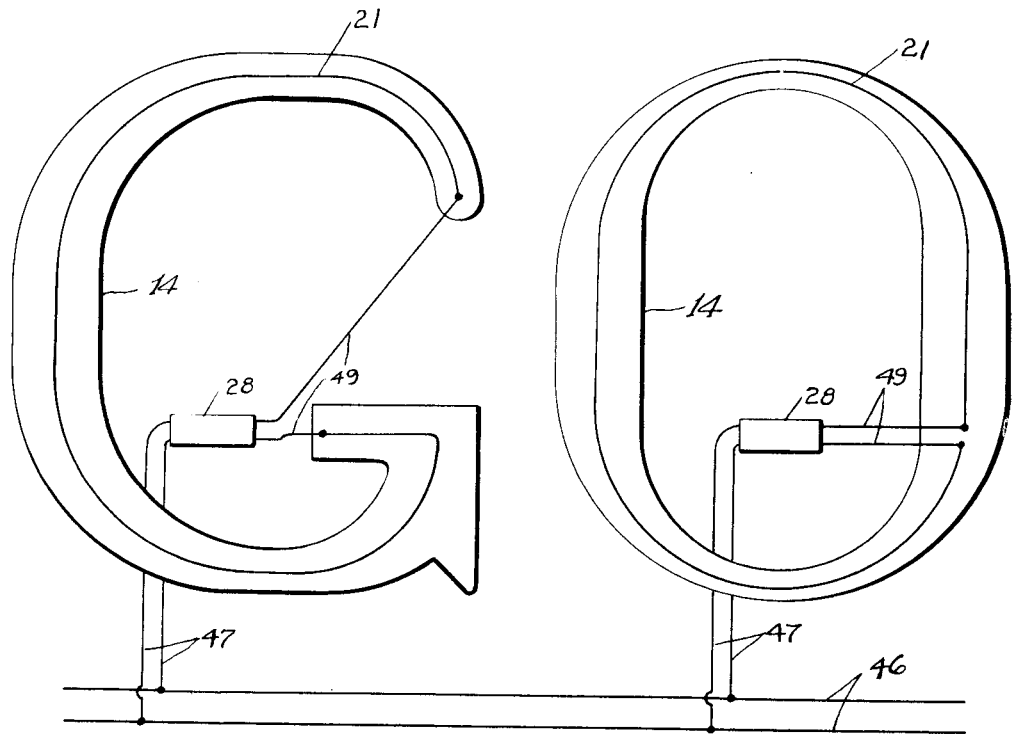
Fig. 12 is a diagrammatic view of the manner in which the power supply is directed to each display device.

Referring to Fig. 12, electrical leads 46 extend from a generator (not shown) in the control car 12 to each of the display characters 14, 38 and 44 and to which conductors 47 are connected to each transformer 28. Additional conductors 49 are connected to the neon tubes 21 in each frame for illuminating the characters of the display. Although the electrical wiring of each neon tube of the characters 14, 38 and 44 are not shown in detail, it is to be understood that each character is wired for illumination according to the diagrammatical illustration of Fig. 12.

The form of the invention illustrated in Figs. 13 to 15 includes a round gas carrying bag or envelope 51 which is adapted to be anchored at any desired height by a cable 52 secured thereto. A plurality of display carrying frames 53 are fastened to the gas bag 51 preferably by straps 54 and patches 55 similar to those described heretofore in detail. The back of the frame is curved as indicated at 57 to conform with the shape of the gas bag 51. Any display device such as a letter 58 is secured to the frame 53 and preferably includes neon tubes or other illuminating apparatus. Neon tube illumination requires transformers 59 which may be mounted on the frames 53 as indicated in Fig. 14.

One of the frames 53 carries no letters 58 but serves to support oppositely turned electric fans 61 or the equivalent thereof. Electric current for the illuminating apparatus and for the fans 61 is provided by suitable conduits carried along with or incorporated in the cable 52. By this construction, the source of electric power need not be carried by the balloon. Mechanism for periodically switching in one fan 61 and then the other is provided in the fan circuit, but as this mechanism is standard and forms no part per se of the present invention, it has not been shown or described in detail.

The alternate running of the opposed fans will cause the gas bag 51 to turn slowly around in one direction and then to turn back slowly in the opposite direction whereby the effectiveness of the display will be greatly increased. By oscillating the bag rather than continuously turning it, kinking in the cable 52 and difficulties in maintaining electric power to the bag are avoided.

While the invention has been illustrated in conjunction with neon lighting, it will be understood that other forms of illuminating means are contemplated and that the invention is not limited to neon lighting.

From the foregoing, it will be apparent that display devices have been incorporated with an airship in such manner that they may readily be detached when it is not desired to use them, and which may be readily applied at any time to the airship with a minimum expenditure of time and labor. In addition, the display devices may be changed to form substantially any combination of letters or words without changing or requiring new fastening means. The display devices also are light in weight and offer a minimum of air resistance during the passage of the airship through the air. The fragile parts of the illuminating portions of the display device are supported on rubber so that any shocks received in landing or in handling are reduced and minimized.

Although only the preferred forms of the invention have been shown and described in detail, it will be apparent to those skilled in the art that the invention is not so limited but that various changes may be made therein without departing from the spirit of the invention or from the scope of the appended claims.

What I claim is:

1. The combination with an airship of a sign including a rigid frame curved to correspond to the contour of the gas carrying envelope of the airship, a channel shaped sign forming member secured to said frame, a neon tube, rubber supporting means securing the neon tube in the channel member, and means for releasably securing the frame to the gas carrying envelope, the last named means including a ring secured to the frame, a patch on the envelope, a ring secured into the patch, and a flexible strap adapted to removably and adjustably connect the rings together.

2. The combination with an airship of a sign including a rigid frame curved to correspond to the contour of the gas carrying envelope of the airship, a channel shaped sign forming member secured to said frame, a neon tube, rubber supporting means securing the neon tube in the channel member and means for securing the frame to the gas carrying envelope.

3. In an airship, a sign including a rigid frame curved to correspond to the contour of the gas carrying envelope of the airship, a neon tube, means for securing the neon tube to the frame, and means for releasably securing the frame to the gas carrying envelope, the last named means including a ring secured to the frame, a patch on the envelope, a ring secured to the patch, and a flexible strap adapted to removably and adjustably connect the rings together.

4. A combination of a display device with an aircraft having a gas-filled envelope which includes a plurality of rigid frames curved to conform with and lie against the gas envelope, means for cushioning each frame from the envelope, means for individually securing each frame to the envelope, and illuminating means carried by each frame and forming the display.

5. An aerial display device for aircraft having a gas-filled envelope comprising a frame built up from a plurality of pivotally connected sections, means on the gas envelope for individually supporting each section, and illuminating means carried by the frame, said illuminating means also forming the display.

6. The combination with an airship having a gas filled envelope and a control car, of a display device, a rigid frame member, illuminating means on the frame member, means flexibly securing the frame at one end to the gas envelope, and means for flexibly securing the other end of the frame to the control car.

7. The combination with an aircraft having a gas carrying envelope, of a display device including a plurality of individual frames curved to conform with and lie against the gas envelope, and means for securing the frames to the envelope including a plurality of rows of aligned patches whereby the number, position and size of the frames can be readily changed without necessitating changes or additions to the fastening means.

8. The combination with an aircraft having a gas carrying envelope, of a display device including a plurality of individual frames, and means for securing the frames to the envelope including a plurality of rows of aligned patches whereby the number, position and size of the frames can be readily changed without necessitating changes or additions to the fastening means.

9. In combination, a lighter-than-air craft including a gas containing envelope, a plurality of light strong frames, each of said frames having one or more sign forming characters thereon, a plurality of patches on the gas envelope and means for securing the frames to any desired patches on the envelope whereby the position, number and arrangement of the sign forming characters can be widely varied as desired with a minimum of effort.

10. In combination, an aircraft including a gas carrying envelope, a frame, cushioning means positioned between the frame and the envelope and adapted to conform to the curve of the envelope, illuminating sign forming means resiliently secured to the frame and means for adjustably and removably securing the frame to the envelope.

11. In combination, an aircraft including a gas enclosing envelope, a plurality of frames, sign forming characters carried by the frames, means pivotally securing the frames together and means for removably securing each frame to the envelope.

HARRY H. HAINES.